(12) United States Patent
Cooley et al.

(10) Patent No.: US 6,776,082 B1
(45) Date of Patent: Aug. 17, 2004

(54) FLUID POWERED ROTARY INDEXER

(75) Inventors: Njell J. Cooley, Davenport, IA (US); Jan C. Mangelsen, Charlotte, IA (US)

(73) Assignee: Genesis Systems Group, Davenport, IA (US)

( * ) Notice: Subject to any disclaimer, the term of this patent is extended or adjusted under 35 U.S.C. 154(b) by 595 days.

(21) Appl. No.: 09/703,017

(22) Filed: Oct. 31, 2000

(51) Int. Cl.⁷ .............................. F01C 9/00; B23Q 3/00
(52) U.S. Cl. ......................................... 92/120; 269/20
(58) Field of Search ................ 92/85 R, 120, 92/121; 269/20

(56) References Cited

U.S. PATENT DOCUMENTS

| | | | | |
|---|---|---|---|---|
| 3,215,045 A | * | 11/1965 | Lissau | 92/120 |
| 3,446,120 A | * | 5/1969 | Sneen | 92/120 |
| 4,009,644 A | | 3/1977 | Higuchi et al. | 92/125 |
| 4,044,631 A | | 8/1977 | Matousek et al. | 74/606 |
| 4,094,231 A | | 6/1978 | Carr | 92/128 |
| 4,370,917 A | | 2/1983 | Bunyard | 91/491 |
| 4,409,888 A | | 10/1983 | Weyer | 92/31 |
| 4,495,856 A | | 1/1985 | Sollami | 92/125 |
| 4,603,616 A | | 8/1986 | Zajac | 92/33 |
| 4,686,863 A | | 8/1987 | Inoue et al. | 74/425 |
| 4,823,678 A | | 4/1989 | Sollami | 92/125 |
| 5,007,330 A | | 4/1991 | Scobie et al. | 92/120 |
| 5,024,116 A | | 6/1991 | Kraft | 74/109 |
| 5,054,374 A | | 10/1991 | Scobie et al. | 92/120 |
| 5,235,900 A | | 8/1993 | Garceau | 92/120 |
| 5,241,895 A | | 9/1993 | Weyer | 92/33 |
| 5,634,390 A | | 6/1997 | Takeuchi et al. | 92/33 |
| 5,918,530 A | | 7/1999 | Kanton et al. | 92/33 |
| 5,996,523 A | * | 12/1999 | Fox | 92/120 |

* cited by examiner

Primary Examiner—Thomas E. Lazo
(74) Attorney, Agent, or Firm—McKee, Voorhees & Sease, P.L.C.

(57) ABSTRACT

A fluid powered rotary indexer includes a housing with a piston rotatably mounted therein. The housing includes ports providing fluid communication to opposing compartments within the housing so as to rotate the piston clockwise or counterclockwise upon the introduction of fluid into one compartment or the other. The piston is rotatably supported by a bearing which is mounted to a work surface. An adapter is connected to the piston for rotation therewith and supports a tool or work piece. The sealing rings are provided between the piston and the housing to provide a fluid seal for the chamber. A central opening is provided in the assembly through which cables, wires, and tubing can be extended.

21 Claims, 10 Drawing Sheets

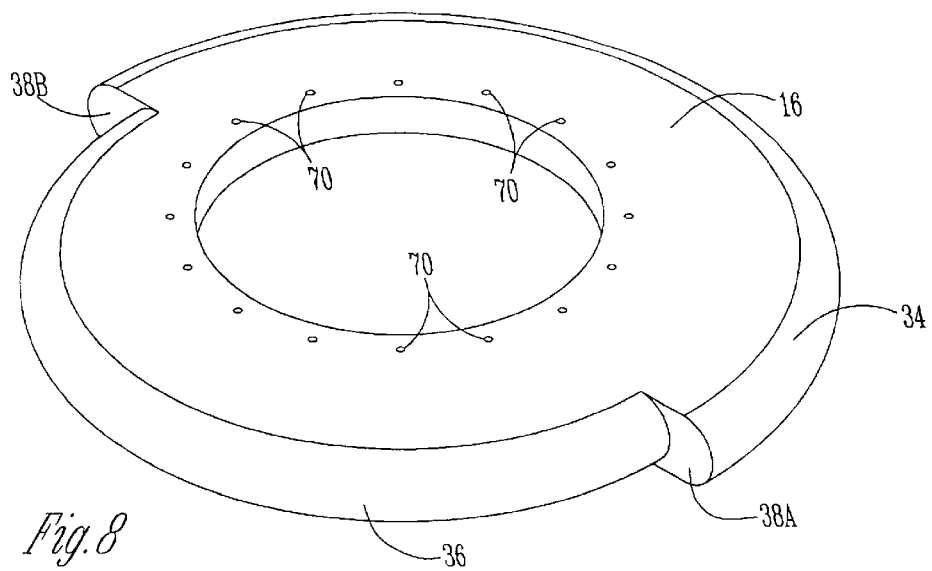
Fig. 8
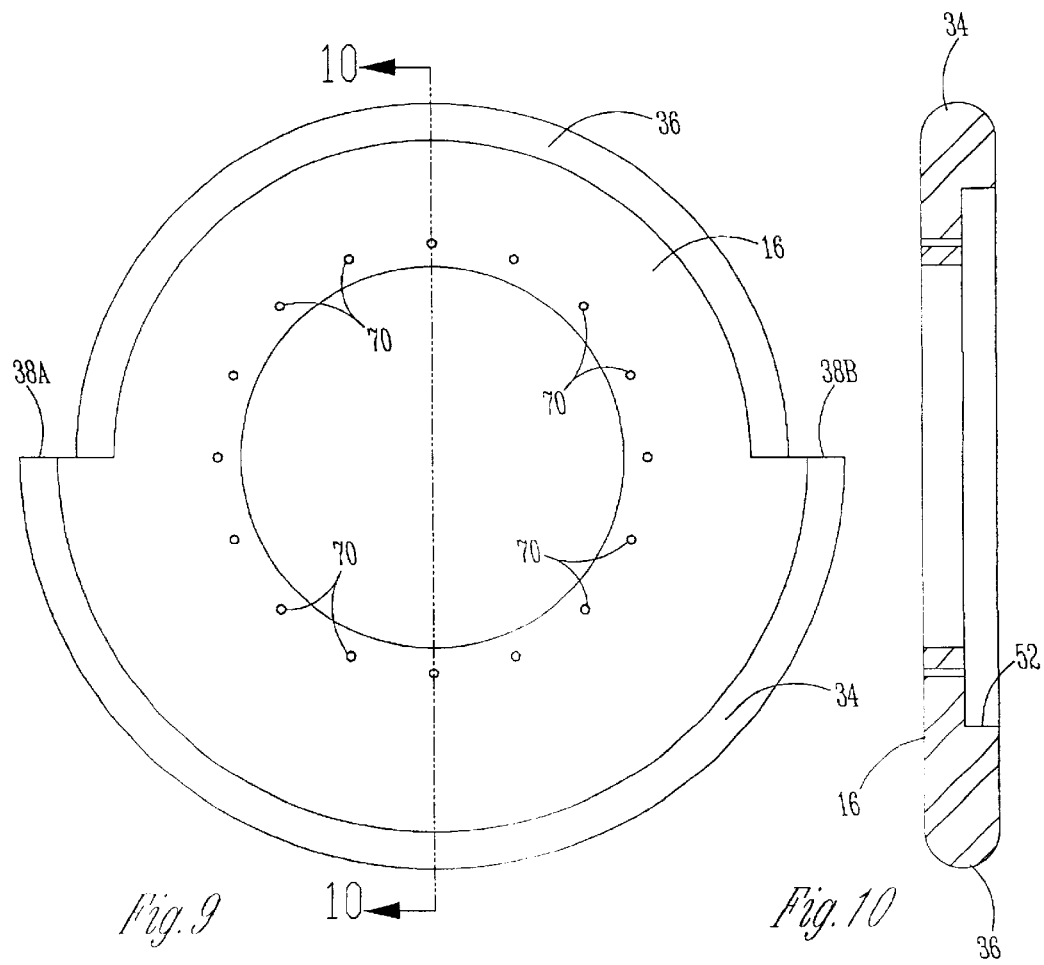
Fig. 9
Fig. 10

FLUID POWERED ROTARY INDEXER

BACKGROUND OF THE INVENTION

In the robotic industry, parts are positively located with tooling for work thereon. The robotic-controlled tooling is normally mounted in a robot work cell or system. In many applications, the tooling is rotated around a centerline through the tooling, with a servomotor and gearbox to set specific desired locations or index points. The rotation may be accomplished in numerous ways, such as with well known rotary pistons. Often times, the tool rotation needs to be limited to less than 180°. However, there is a high cost for implementing the controls and power for limiting the rotational movement generated by the servomotor. Therefore, there is a need for a low cost system for rotating tooling between 0 and 180° for robotic welding.

Accordingly, a primary objective of the present invention is the provision of a fluid powered rotary indexer for use in robotic-controlled processes.

Another objective of the present invention is the provision of a device for efficiently and economically rotating robotic tooling to selected angular degrees.

A further objective of the present invention is the provision of a plurality of assemblies which can be interconnected in series so as to perform sequential rotational steps for robotic tool work.

Another objective of the present invention is the provision of a rotary indexer which replaces the servomotor in robotic tooling operations.

Another objective of the present invention is the provision of a plurality of assemblies which are connected in parallel so as to provide increased torque for rotating robotic tooling.

These and other objectives will become apparent from the following description of the invention.

SUMMARY OF THE INVENTION

The present invention is directed towards an assembly for rotating tooling to a selected angular degree for robotic welding. The assembly includes a housing with a chamber therein, and a piston rotatably mounted in the housing. The piston includes two arcuate portions with different radii. A sealing ring extends around the piston so as to divide the chamber into two compartments. Fluid ports are provided in the housing to provide fluid communication to each of the compartments in the chamber. When fluid is introduced into one compartment, the piston is rotated, thereby expelling fluid from the other compartment. Sealing rings are provided between the piston and housing to provide a fluid seal for the compartments. The piston is rotationally supported in the chamber by a bearing. An adapter is connected to the piston and is adapted to support the tool for rotation with the piston.

Two or more assemblies may be interconnected in series or in parallel. When connected in series, each assembly can be sequentially activated so as to sequentially rotate the tooling to first and second desired positions for sequential robotic tooling steps. When the assemblies are connected in parallel, the pistons rotate in unison to provide increased torque for the tooling.

BRIEF DESCRIPTION OF THE DRAWINGS

FIG. 8 is a perspective view of the piston.

FIG. 9 is a top plan view of the piston.

FIG. 10 is a sectional view taken along lines 10—10 of FIG. 9.

DETAILED DESCRIPTION OF THE DRAWINGS

The fluid powered rotary indexer of the present invention is particularly adapted for use in supporting tooling used in robotic-controlled tooling operations. However, it is understood that the indexer can also be used in other applications, such as supporting a work piece for selective rotation thereof.

Figure 5:
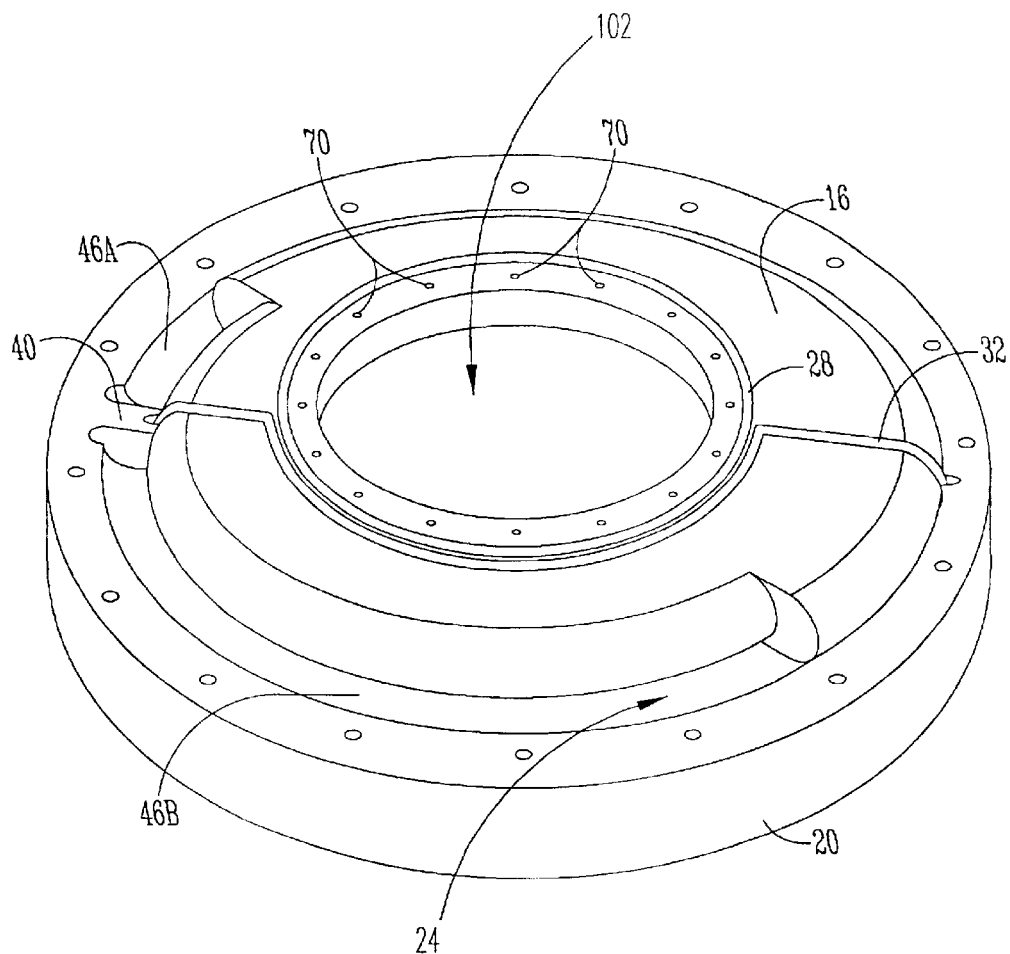
FIG. 5 is a perspective view showing a partial assembly of the housing and piston.
Figure 19:
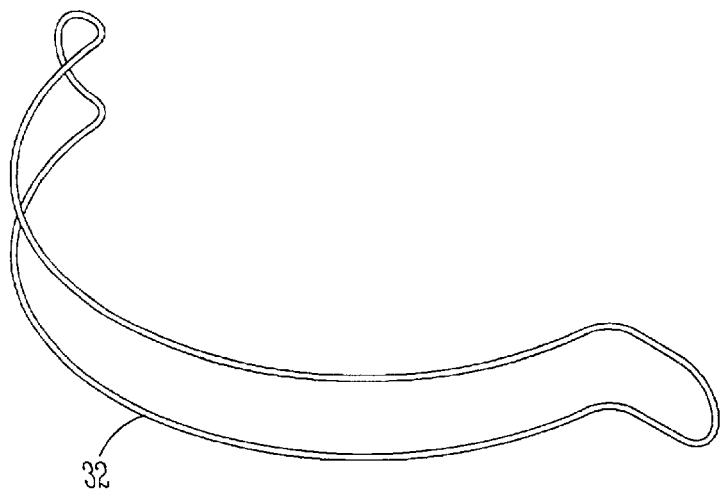
FIG. 19 is a perspective view of the continuous seal which extends around the piston.
Figure 20:
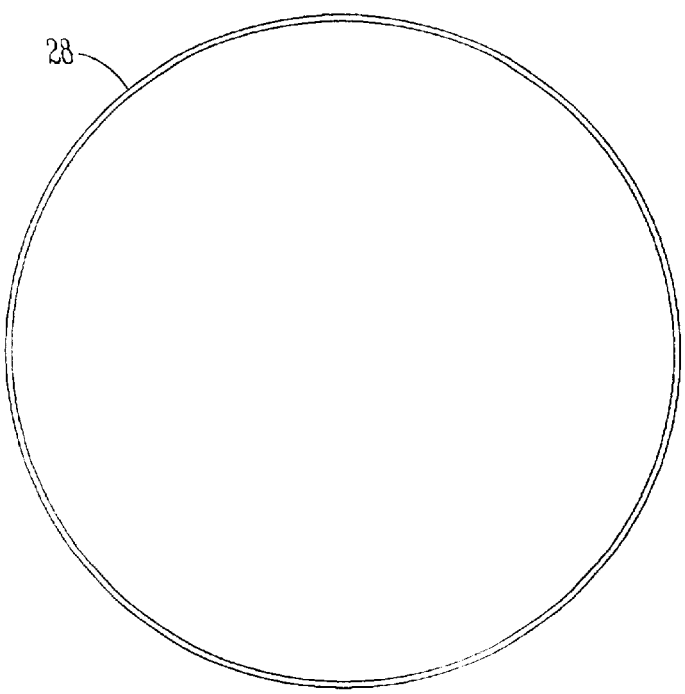
FIG. 20 is a top plan view of one of the O-ring seals which reside between the piston and the housing.

The rotary indexer generally includes an assembly 12 including a housing 14 with a piston or puck 16 rotatably mounted within the housing. The housing 14 includes opposite shells 18, 20, each of which have a recess 22 formed therein. Thus, when the shells 18, 20 are joined, the recesses 22 define a circular chamber 24 in which the piston 16 is mounted. An annular groove 26 is provided in each housing shell 18, 20 and is adapted to receive an O-ring seal 28, which sealingly engage the upper and lower surfaces of the piston 16. Each housing shell 18, 20 further includes a transverse groove 30 extending across the recesses 22 for receiving a continuous seal 32, which is shown in FIG. 19. The seal 32 extends around the piston 16, as best seen in FIG. 5. The housing shells 18, 20 are best seen in FIGS. 11–14, The piston 16 is shown in FIGS. 8–10. The piston 16 is generally disc-shaped, with a large diameter portion 34 and a small diameter portion 36. Opposite radially extending surfaces 38 extend between the large diameter portion 16 and small diameter portion 36. The diameter of the large diameter portion 34 is slightly smaller than the diameter of the recesses 22 in the housing shells 18, 20, such that the large diameter portion substantially matingly fits within the chamber 24. The outer peripheral edges of the large diameter portion 34 and small diameter portion 36 are curved, with the curvature of the larger diameter portion 34 substantially matching the curvature of the perimeter edge of the recesses 22.

Figure 1:
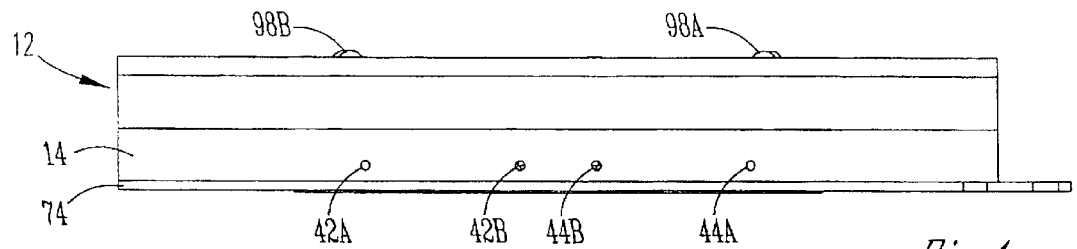
FIG. 1 is a side elevation view of the assembly of the present invention.
Figure 2:
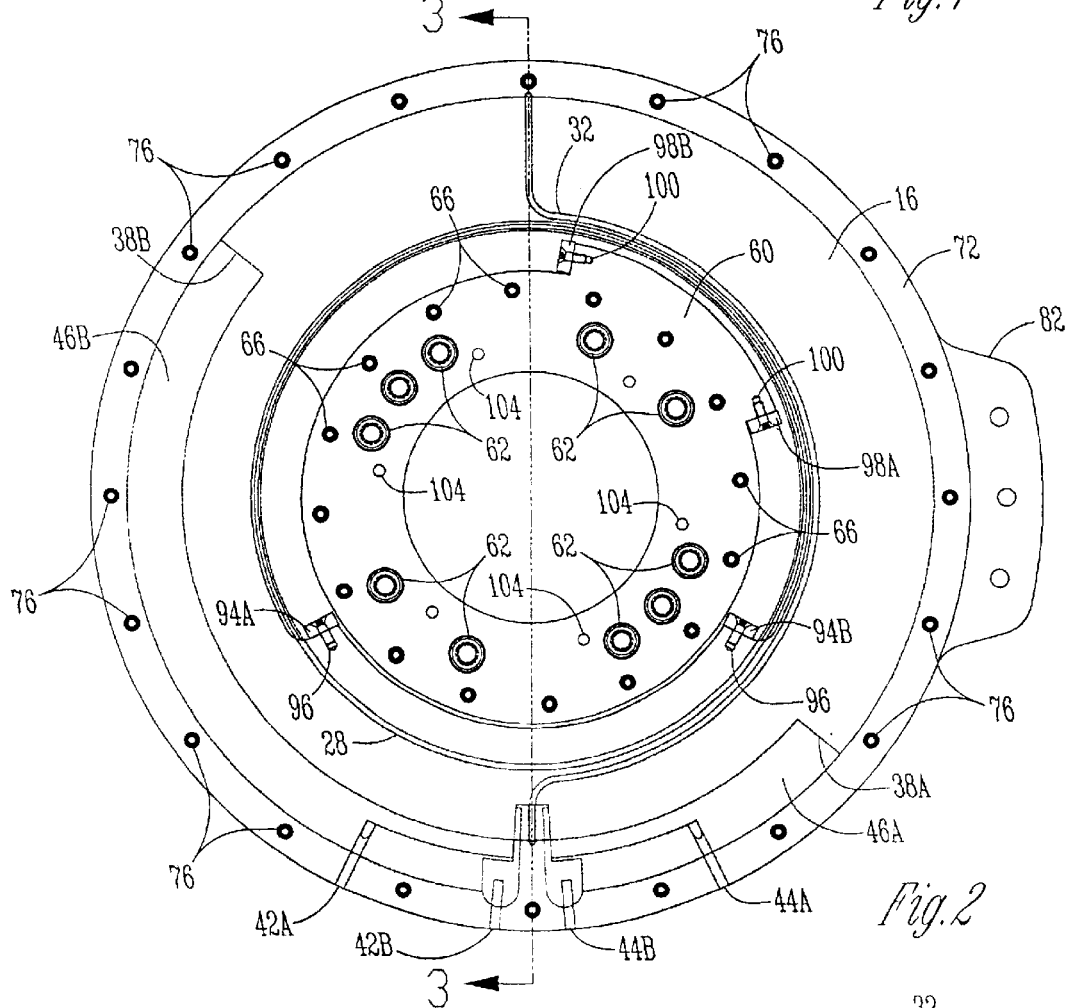
FIG. 2 is a top plan view of the assembly.
Figure 6:
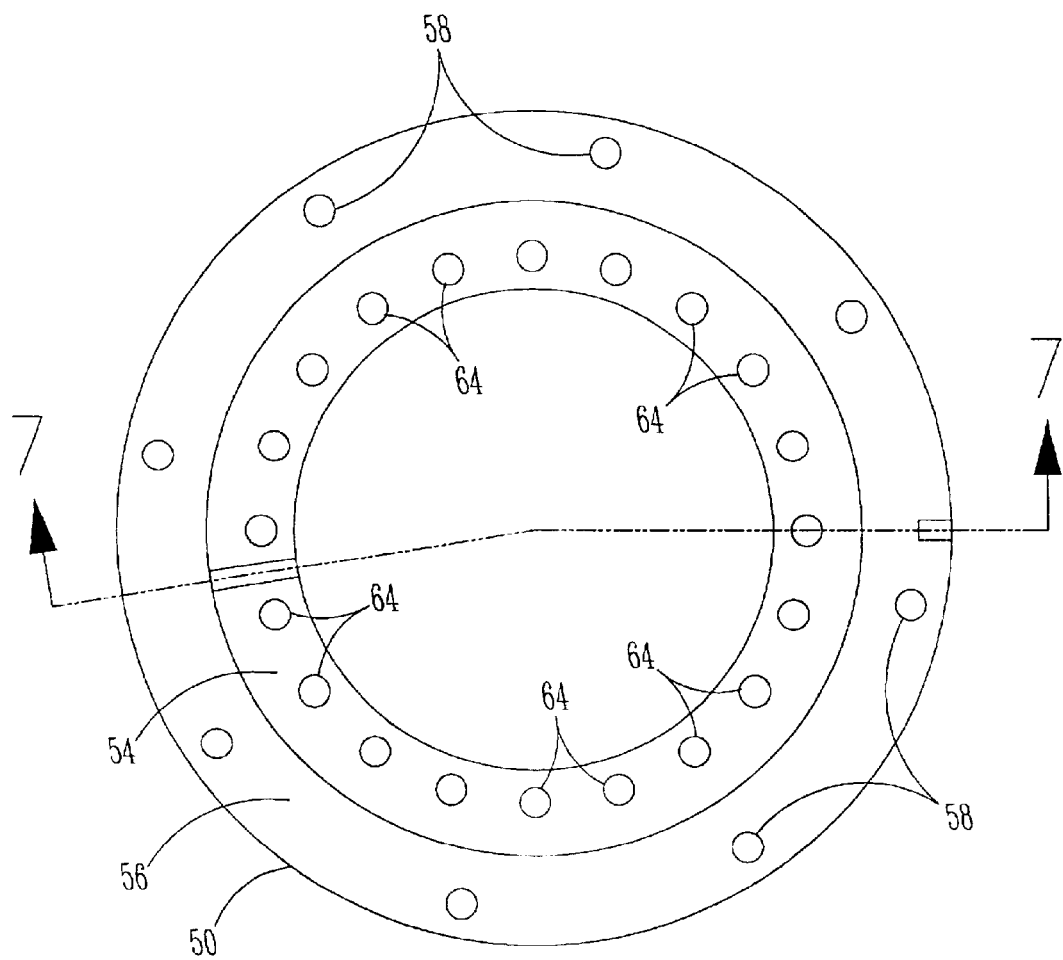
FIG. 6 is a plan view of the bearing.
Figure 7:
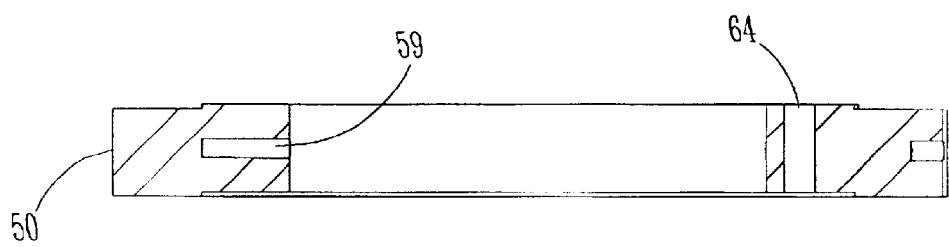
FIG. 7 is a sectional view taken along lines 7—7 of FIG. 6.
Figure 11:
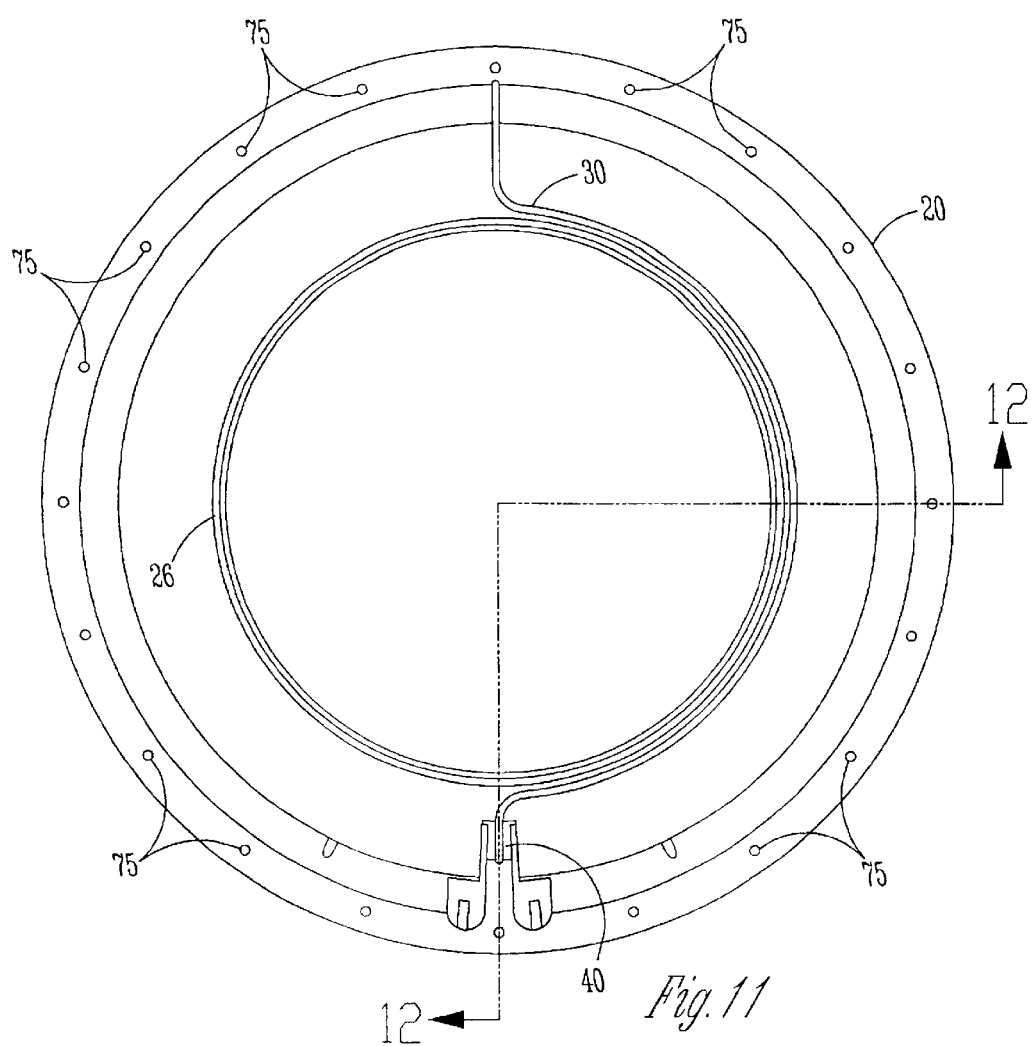
FIG. 11 is a plan view of the lower housing shell.
Figure 12:
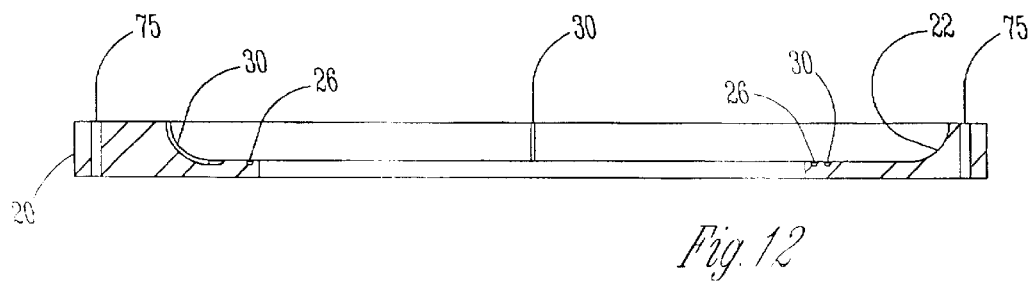
FIG. 12 is a sectional view taken along lines 12—12 of FIG. 11.
Figure 13:
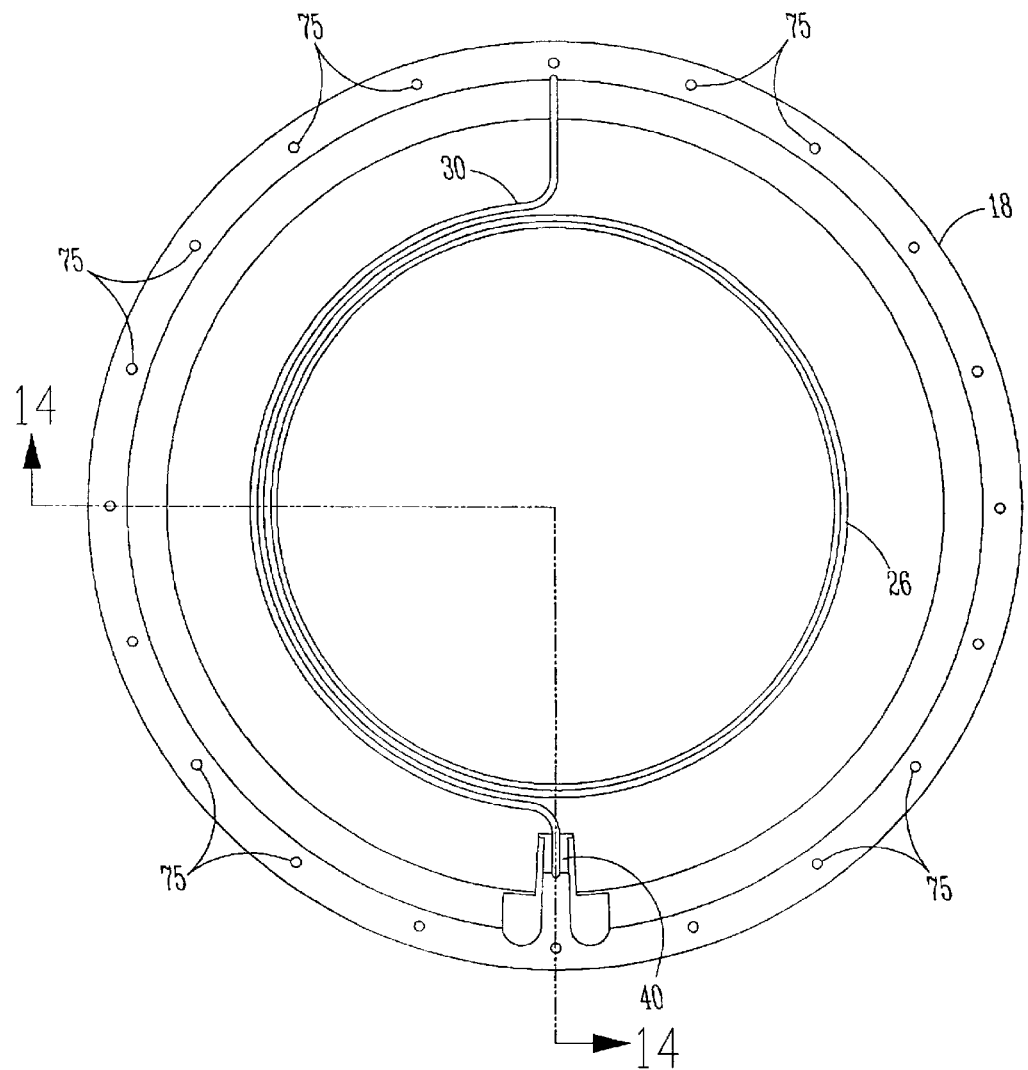
FIG. 13 is a plan view of the upper housing shell.
Figure 14:
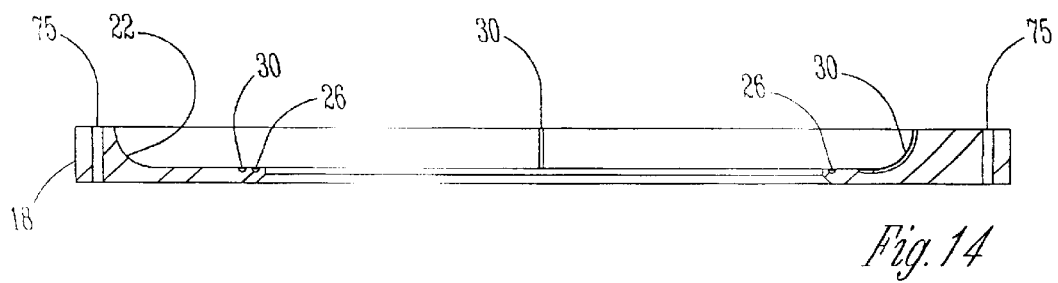
FIG. 14 is a sectional view taken along lines 14—14 of FIG. 13.

As seen in FIGS. 5, 11 and 13, the housing shells 18, 20 each include a rib 40. Fluid ports 42A, 42B and 44A, 44B extend through the wall of the lower shell 18, on opposite sides of the rib 40, as best seen in FIGS. 2 and 6. The fluid ports 42A, 42B, 44A, and 44B are adapted to be connected to a fluid source, which may be either hydraulic or pneumatic.

The small diameter portion 36 of the piston 16 and the ribs 40 define compartments 46A, 46B within the assembly 12. The compartments 46A, 46B may be air filled or liquid filled. The size of the compartments 46A, 46B varies as the piston 16 is rotated within the housing 14, as described below.

The assembly 12 further includes a bearing 50 to rotatably support the piston 16. The bearing 50 may be a commercially available Rotek bearing. The piston 16 includes a recessed shoulder 52 on the bottom side thereof, as best seen in FIG. 10, to matingly receive the bearing 50. As seen in FIG. 6, the bearing 50 includes an inner rotatable race 54 and an outer race 56. The outer race 56 includes a plurality of holes 58 for mounting the bearing 50 to a work surface, with bolts (not shown) extending into the holes 58 from beneath the work surface. A grease zerk 59 is provided in the bearing 50 for greasing the bearing.

A bearing adapter 60 is secured to the inner race 54 of the bearing 50 by a plurality of bolts 62 extending through holes 63 in the adapter 60 and into tapped holes 64 in the inner race 54 of the bearing 50. The adapter 60 is also mounted to the piston 16 for rotation therewith by screws or bolts 66 which extend through holes 68 in the bearing adapter 60 and into tapped holes 70 in the piston 16.

Figure 3:
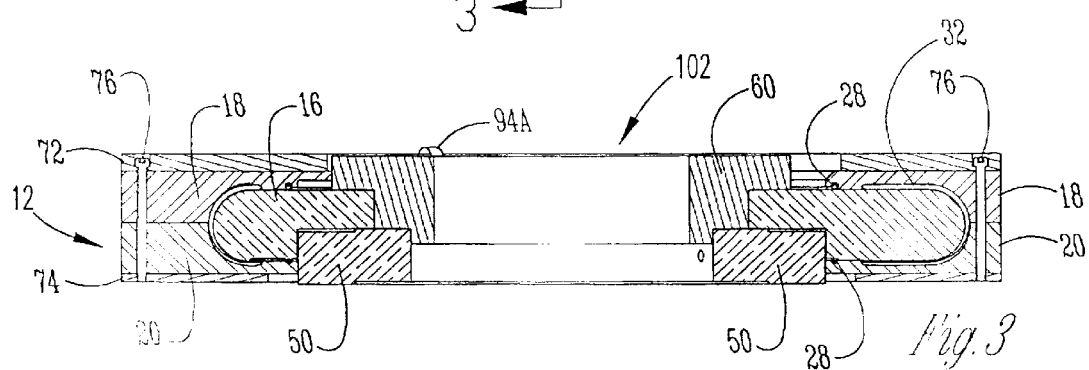
FIG. 3 is a sectional view taken along lines 3—3 of FIG. 2.
Figure 4:
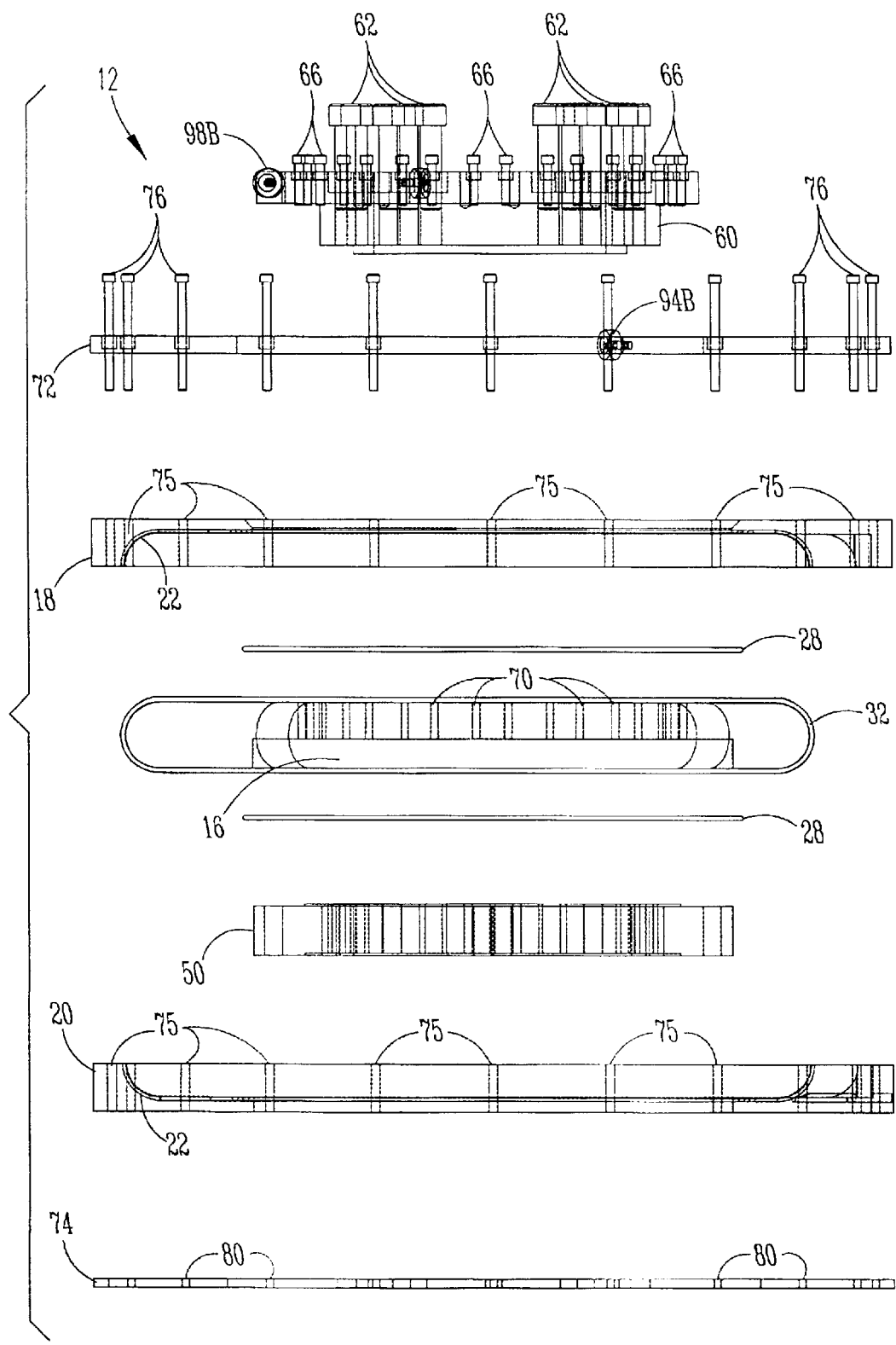
FIG. 4 is an exploded view of the components of the assembly.

The housing shells 18, 20 are sandwiched between an upper plate 72 and a lower plate 74, as best seen in FIGS. 3 and 4. The plates 72, 74 are secured together by bolts 76 extending through holes 80 in the upper plate 72, through holes 75 in the housing shells 18, 20, and into tapped holes 80 in the lower plate 74. The lower plate 74 includes a tab 82 extending outwardly. The tab 82 includes holes 84 which permit the lower plate 74 to be pinned to the work surface to prevent rotation of the assembled plates 72, 74.

Figure 18:
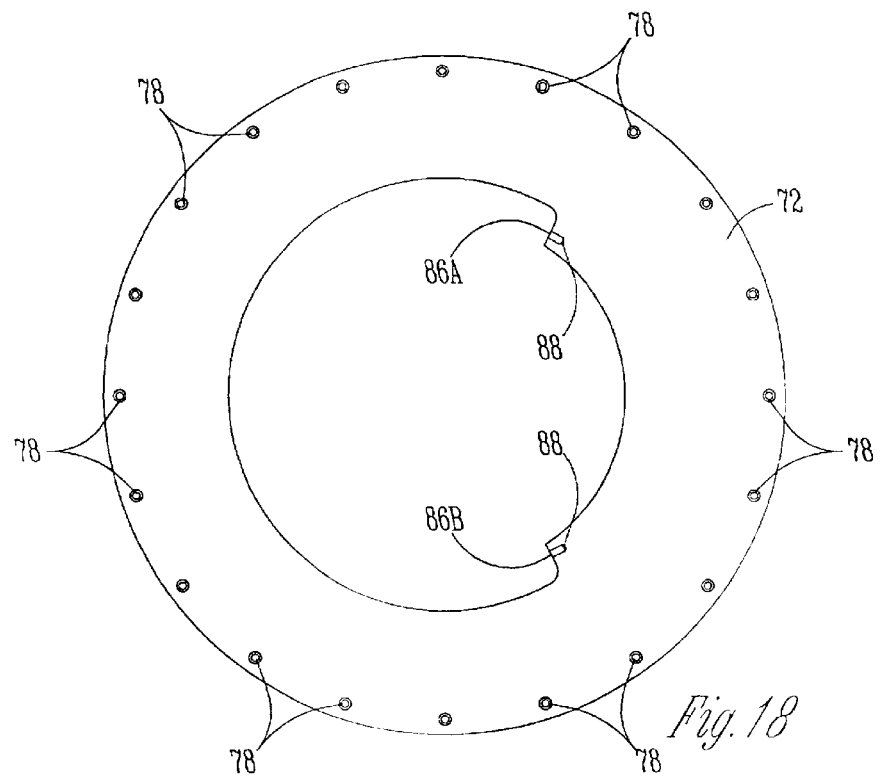
FIG. 18 is a plan view of the upper support plate.

The upper plate 72 includes a pair of shoulders 86, each having a tapped hole 88, as best seen in FIG. 18. Similarly, the bearing adapter 60 includes a pair of shoulders 90, each having a tapped hole 92. As seen in FIG. 2, rest or stop pads 94A, 94B are mounted on each shoulder 86 via a bolt 96 extending into the holes 86. Similarly, rest pads 98A, 98B are mounted on each shoulder 90 via a bolt 100 extending into the holes 92.

Each of the components of the assembly 12 are generally circular in shape with a central hole therein. Thus, when the components are assembled, the assembly 12 includes a central opening 102, as seen in FIG. 3, through which cabling, wires and tubing can extend.

The assembly 12 is constructed by stacking the lower plate 74 and the lower housing shell 20 over the bearing 50. Then, the lower O-ring 28 is laid into the groove 26 in the lower shell 20. The continuous seal 32 is laid in the groove 30 in the lower shell 20, while the piston 16 is slipped inside the seal 32 and seated in the recess 22 of the lower shell 20. The bearing adapter 60 is then bolted to the piston 16 with the bolts 66, and then bolted to the inner race 54 of the bearing 50 with bolts 62. The rest pads 98A, 98B are then mounted on the bearing adapter 60 using bolts 100. The upper O-ring 28 is then placed in the groove 26 of the upper housing shell 18, which is then carefully laid into place on top of the piston 16 such that the continuous seal 32 seats itself in the transverse groove 30 of the upper shell 18. The seals 28 and 32 may be held in place with grease to prevent movement while assembling the upper shell 18 onto the lower shell 20. The rest pads 94A, 94B are mounted on the upper plate 72 using bolts 96. The upper plate 72 is then laid on top of the upper shell 18 and is bolted to the lower shell 20 using the bolts 76.

The assembled indexer 12 can then be secured to a support surface from the bottom side, with mounting bolts (not shown) extending upwardly into tapped holes in the bottom surface of the bearing 50. The tab 82 of the lower support plate 74 may also be pinned or bolted to the support surface so as to prevent rotation of the shells 18, 20 and plates 72, 74 when the piston 16 is rotated. It is understood that the assembly 12 can also be inverted and over hung from above so as to support a downwardly extending robotic tool or work piece. As a further alternative, the assembly 12 can be mounted on a post extending from any direction in a workstation.

Figure 15:
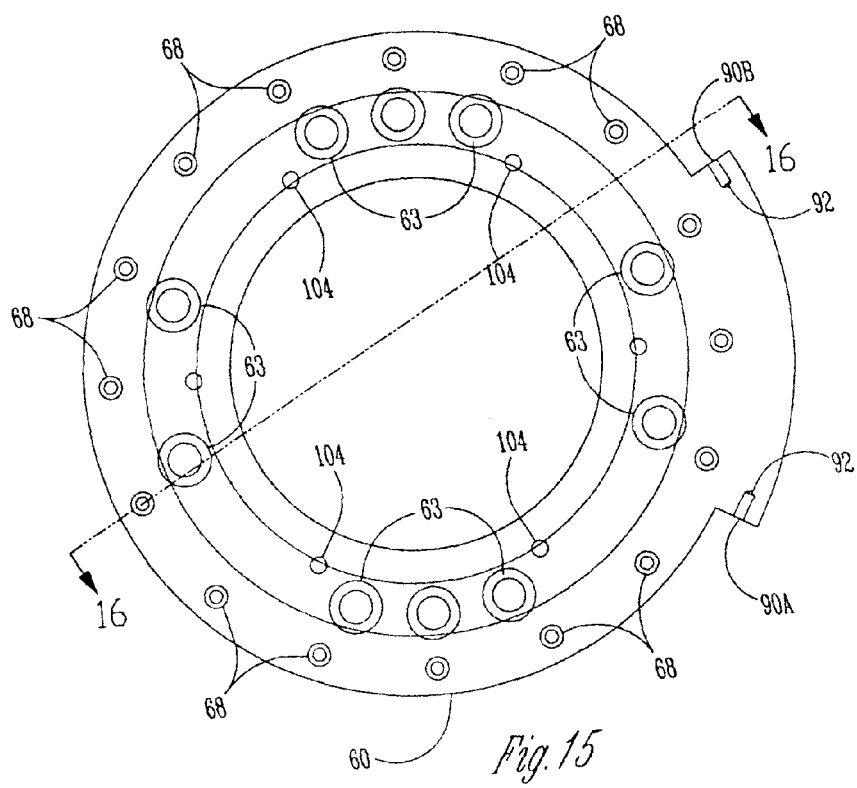
FIG. 15 is a top plan view of the bearing adapter.
Figure 16:
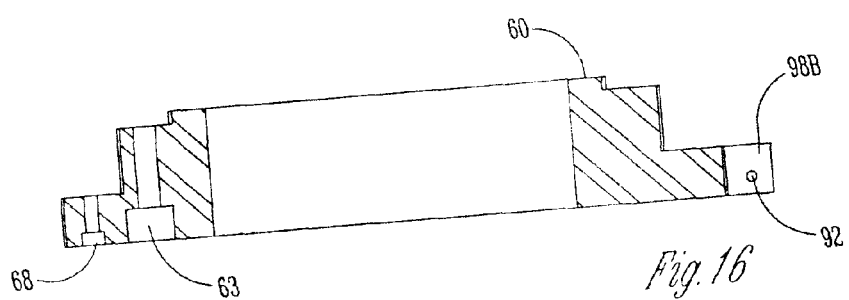
FIG. 16 is a sectional view taken along lines 16—16 of FIG. 15.
Figure 17:
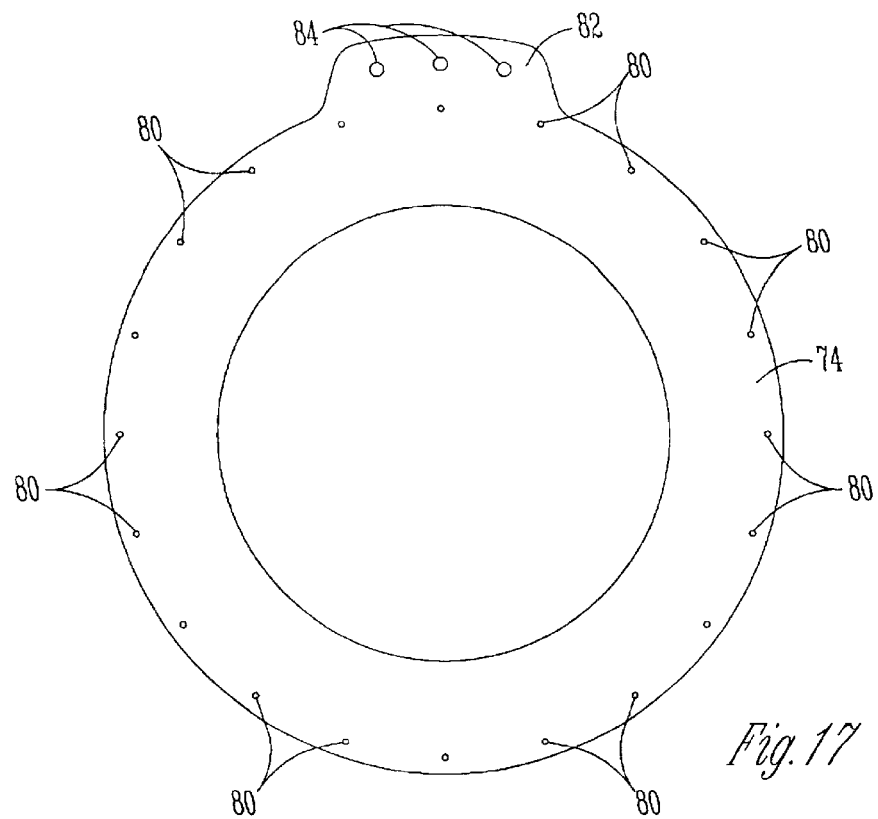
FIG. 17 is a plan view of the lower support plate.

The tool or work piece (not shown) may be bolted directly to the adapter 60 or may be mounted on a tailstock shaft which is bolted to the adapter 60 via tapped hoes 104. (FIGS. 2 and 15). The load from the tool is transferred from the adapter 60 to the bearing 50 without affecting the piston 16 or causing the large diameter portion 34 of the piston 16 to rub against the sidewall of the housing chamber 24.

Conventional fluid fittings are screwed into the ports 44A, 442, 46A, and 46B to provide fluid communication to the housing compartments 46A, 46B. When air or liquid is introduced through the fluid ports 42A, 42B, the fluid acts upon the radial surface 38A so as to rotate the piston in a clockwise direction as seen in FIG. 2, thereby expelling fluid from the ports 44A, 44B. Conversely, when air or liquid is introduced into the fluid ports 44A, 44B, the fluid acts upon the radial surface 38B of the piston 16, causing the piston to rotate in a counterclockwise direction, as seen in FIG. 2, thereby expelling fluid from the ports 42A, 42B. As the large diameter portion 34 of the piston 16 moves past the fluid port 44A or 42A when rotating in one direction or the other, respectively, the port 44A or 42A is closed so as to provide a dampening effect, since there is only one remaining open port 44B or 42B through which the fluid is discharged.

In use, as the piston 16 is rotated clockwise or counterclockwise, the bearing adapter 60 rotates therewith, relative to the upper plate 72. The rest pads 94A, 94B, 98A, 98B limit the extent of rotation of the piston 16. More particularly, when the piston 16 is rotated in a clockwise direction, as seen in FIG. 2, the rest pad 98A will eventually contact the rest pad 94B. Similarly, when the piston 16 is rotated in a counterclockwise direction, eventually the rest pad 98B will contact the rest pad 94A to stop rotation of the piston 16, before the piston 16 contacts the rib 40, which can be seen more clearly in FIG. 5.

As shown in the drawings, the piston 16 is rotatable approximately 180° in both the clockwise and counterclockwise directions. It is understood that the angular relationship of the radial surfaces 38A, 38B on the piston 16 may be increased or decreased so as to decrease or increase, respectively, the degree of rotation within the housing 14. Alternatively, the angular orientation of the shoulders 86A, 86B on the upper plate 72 and/or the angular relationship of the shoulders 90A, 90B on the bearing adapter may be increased or decreased so as to control the extent of rotation of the piston 16. The width of the ribs 40 may also be increased so as to limit the rotation of the piston 16.

The rotational force generated by the piston 16 is a function of the fluid pressure and the surface area of the radial surfaces 38A, 38B of the piston 16. The resultant force can be increased by increasing the fluid pressure or the area of the radial surfaces 38A, 38B. Also, since torque is a function of the force and the moment arm, increased torque can be obtained by increasing the scale of the piston 16 and housing 14 to a larger diameter.

Multiple assemblies 12 may be connected in series, with the tooling or work piece being mounted on the last assembly. In such a serial combination, each assembly can be sequentially actuated so that the tooling can be sequentially rotated to a number of different angular positions, with a separate tooling step being performed at each position.

Multiple assemblies 12 may also be connected in parallel, with the tooling or work piece mounted on the last assembly. In such a parallel combination, the multiple pistons are actuated in unison so as to provide increased torque for the rotating tooling.

Thus, the indexer assembly 12 generates true rotational/rotary motion without the use of mechanical mechanisms for translating linear motion into rotational motion. The piston 16 can be rotated with either compressible or incompressible fluids, including shop air, hydraulic fluid, air over water, and the like. The rotary indexer assembly 12 provides constant torque and force throughout its rotational indexing sweep. By altering the design dimensions of the piston 16 and the housing 14, the working torque, output or resultant force, and rotational limits of the assembly 12 can be varied. Furthermore, the central opening 102 through the assembly 12 allows electrical, mechanical, pneumatic and hydraulic linkages, wires, cables, and other objects to pass through the assembly without interfering with the rotational motion generated by the piston 16. A tool mounted on the adapter 60 is infinitely positionable anywhere between the rotational limits of the piston 16.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A device for rotationally supporting a tool or work piece, comprising:
   a housing with a chamber therein;
   a piston rotatably mounted within the chamber of the housing to form a first assembly, the piston being adapted to operatively support the tool or work piece;
   the piston being disc-shaped with a large diameter portion and a small diameter portion and radially extending surfaces extending between the large and small diameter portions; and
   ports in the housing providing fluid communication with the chamber whereby introduction of fluid into the chamber imparts rotation to the piston and the tool or work piece.

2. The device of claim 1 further comprising a bearing for rotationally supporting the piston in the housing.

3. The device of claim 1 further comprising sealing rings between the piston and housing to provide a fluid seal for the chamber.

4. The device of claim 1 further comprising an adapter mounted to the piston and being adapted to support the tool or work piece for rotation with the piston.

5. The device of claim 1 wherein the chamber includes a rib to limit the rotational movement of the piston.

6. The device of claim 5 wherein the piston includes opposite surfaces against which fluid acts to rotate the piston in opposite directions.

7. The device of claim 6 wherein the piston surfaces and rib divides the chamber into two compartments.

8. The device of claim 7 wherein the ports are located on each side of the rib to provide selective fluid communication to each compartment.

9. The device of claim 1 wherein a second housing and piston assembly is mounted on the first assembly.

10. The device of claim 9 wherein the first and second assemblies are actuated sequentially.

11. The device of claim 9 wherein the first and second assemblies are actuated simultaneously.

12. The device of claim 1 wherein the housing is sandwiched between a pair of support plates.

13. The device of claim 1 wherein the first assembly has an axially extending opening.

14. The device of claim 1 further comprises rest pads operatively mounted on the housing to limit the rotational movement of the piston.

15. The device of claim 1 wherein the radially extending surfaces of the piston are approximately 180° apart.

16. The device of claim 1 wherein the housing includes half shells each having a recess, with the shells being clamped together such that the recesses form the chamber.

17. The device of claim 1 further comprising a seal seated in the housing and extending around the piston so as to divide the chamber into two compartments.

18. A method of rotating an object, comprising:
   attaching the object to a piston rotationally supported within a chamber of a housing, the piston having spaced apart radially extending surfaces, the housing having fluid inlet ports and fluid outlet ports;
   introducing fluid through a first port in the housing and into the chamber so as to impart a force on one of the radially extending surfaces of the piston and thereby rotate the piston and object up to 180° to a desired orientation; and
   closing at least one outlet port after partial rotation of the piston to dampen the rotational movement of the piston.

19. A method of rotating an object, comprising:
   attaching the object to a piston rotationally supported within a chamber of a housing, the piston having spaced apart radially extending surfaces, housing and piston forming a first assembly;
   introducing a fluid through first port in the housing and into the chamber so as to impart a force on one of the radially extending surfaces of the piston and thereby rotate the piston and object up to 180° to a desired orientation; and
   mounting a second housing and piston assembly onto the first assembly and rotating the piston of the second assemblies fluid pressure.

20. The method of claim 19 further comprising actuating the first and second assemblies sequentially.

21. The method of claim 19 further comprising actuating the first and second assemblies simultaneously.

* * * * *